US010995846B2

(12) United States Patent
Poster

(10) Patent No.: US 10,995,846 B2
(45) Date of Patent: May 4, 2021

(54) FAN WITH LABYRINTH SEAL FOR PREVENTION OF WATER DAMAGE TO A GEARBOX

(71) Applicant: Bell Helicopter Textron Inc., Forth Worth, TX (US)

(72) Inventor: Scott David Poster, Arlington, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 721 days.

(21) Appl. No.: 15/704,355

(22) Filed: Sep. 14, 2017

(65) Prior Publication Data

US 2018/0087647 A1 Mar. 29, 2018

Related U.S. Application Data

(60) Provisional application No. 62/399,097, filed on Sep. 23, 2016, provisional application No. 62/423,371, filed on Nov. 17, 2016.

(51) Int. Cl.
*F16H 57/029* (2012.01)
*F16H 57/04* (2010.01)
*B64C 27/14* (2006.01)
*B64C 27/12* (2006.01)
*F16J 15/447* (2006.01)

(52) U.S. Cl.
CPC .......... *F16H 57/029* (2013.01); *B64C 27/12* (2013.01); *B64C 27/14* (2013.01); *F16H 57/0412* (2013.01); *F16H 57/0416* (2013.01); *F16H 57/0435* (2013.01); *F16J 15/447* (2013.01)

(58) Field of Classification Search
CPC ............... F16H 57/029; F16H 57/0412; F16H 57/0416; F16H 57/0435; B64C 27/12; B64C 27/14; F16J 15/447
See application file for complete search history.

(56) References Cited

U.S. PATENT DOCUMENTS

| 4,248,566 A * | 2/1981 | Chapman ............ F04D 27/0215 |
| | | 415/26 |
| 4,817,846 A * | 4/1989 | Eichinger .............. F16J 15/008 |
| | | 277/370 |
| 5,201,845 A * | 4/1993 | Allmon ................... F01D 25/18 |
| | | 184/6.23 |
| 5,242,033 A * | 9/1993 | Toraason ............ F16H 57/0412 |
| | | 184/6.12 |

(Continued)

FOREIGN PATENT DOCUMENTS

| EP | 2505878 A1 * | 10/2012 | ......... F16H 57/0442 |
| EP | 2505878 A1 | 10/2012 | |

(Continued)

OTHER PUBLICATIONS

European Patent Office, European Search Report for EP Appl. No. 17192695.9 dated Feb. 14, 2018, 4 pp.

(Continued)

*Primary Examiner* — Eugene G Byrd
(74) *Attorney, Agent, or Firm* — Edwin S. Flores; Daniel J. Chalker; Chalker Flores, LLP

(57) ABSTRACT

The present invention includes a system, method and kit for preventing or reducing water penetration of a gearbox, the system including: a fan or impeller coupled to the gearbox; and a hub coupled to the fan and shaped to provide a labyrinth seal that prevents or reduces water penetration into the gearbox.

36 Claims, 4 Drawing Sheets

(56) References Cited

U.S. PATENT DOCUMENTS

| | | | | |
|---|---|---|---|---|
| 5,540,553 | A * | 7/1996 | Goto | C08J 5/06 |
| | | | | 416/241 A |
| 6,106,224 | A * | 8/2000 | Sheth | F04D 29/0413 |
| | | | | 415/104 |
| 6,312,224 | B1 * | 11/2001 | Knott | F01D 5/143 |
| | | | | 416/229 A |
| 7,025,356 | B1 | 4/2006 | Cheung et al. | |
| 7,726,021 | B2 * | 6/2010 | Barnett | B23P 6/005 |
| | | | | 277/412 |
| 9,458,923 | B2 | 10/2016 | Poster et al. | |
| 2013/0089409 | A1 | 4/2013 | Bedrine et al. | |
| 2016/0258526 | A1 | 9/2016 | Morizono | |
| 2018/0087670 | A1 * | 3/2018 | Poster | F16J 15/453 |
| 2018/0119793 | A1 * | 5/2018 | Doveri | F16H 57/031 |
| 2018/0119794 | A1 * | 5/2018 | Schwan | F16H 57/031 |
| 2018/0298827 | A1 * | 10/2018 | Lafargue | F01D 15/12 |

FOREIGN PATENT DOCUMENTS

| | | |
|---|---|---|
| EP | 3299667 A1 | 3/2018 |
| JP | 08305499 H | 2/1996 |
| WO | 2016018498 A1 | 2/2016 |
| WO | WO-2016018498 A1 * | 2/2016 ................ F02C 7/14 |

OTHER PUBLICATIONS

Bell Helicopter Textron Inc., "Bell 525 Relentless" Poster, Nov. 12, 2014.

Perry, Dominic , "Analysis: Bell 525 Relentless cutaway and Technical Description" Flight International, Nov. 14, 2014, London, https://www.flightglobal.com/news/articles/analysisbell525relentlesscutawayandtechnical405541/.

European Patent Office, Communication pursuant to Article 94(3) EPC for EP Appl. No. 17192695.9 dated Jun. 18, 2019, 5 pp.

European Patent Office, Communication pursuant to Article 94(3) EPC for EP Appl. No. 17192695.9 dated Dec. 6, 2018, 5 pp.

European Patent Office, Communication pursuant to Article 94(3) EPC for EP Appl. No. 17192695.9 dated Mar. 6, 2018, 7 pp.

European Patent Office, Communication pursuant to Article 94(3) EPC for EP Appl. No. 17192695.9 dated Jul. 17, 2018, 5 pp.

* cited by examiner

FAN WITH LABYRINTH SEAL FOR PREVENTION OF WATER DAMAGE TO A GEARBOX

CROSS-REFERENCE TO RELATED APPLICATIONS

This patent application claims priority to U.S. provisional patent application Ser. No. 62/399,097 filed on Sep. 23, 2016 entitled "Improved Helicopter Transmission System" and U.S. provisional patent application Ser. No. 62/423,371 filed on Nov. 17, 2016 entitled "Improved Helicopter Transmission System," all of which are hereby incorporated by reference in their entirety.

STATEMENT OF FEDERALLY FUNDED RESEARCH

This application is not the subject of any federally sponsored research or development.

TECHNICAL FIELD OF THE INVENTION

The present invention relates in general to the field of water penetration, and more particularly, to an apparatus and method for preventing water damage to a gearbox.

BACKGROUND OF THE INVENTION

Without limiting the scope of the invention, its background is described in connection with lubrication systems.

One such invention is taught in U.S. Pat. No.. 9,458,923, issued to Poster, et al., entitled "Gearbox with passive lubrication system." These inventors teach a lubrication system that includes a reserve housing configured to retain a lubrication fluid. A supply line in fluid communication with the reserve housing is configured to provide pressurized lubrication fluid to the reserve housing. An overflow tube has an overflow port, the overflow tube being configured to prevent the volume of the lubrication fluid from exceeding a certain amount. A metering jet is configured to allow the lubrication fluid to flow from the reserve housing onto a component, such as a bearing, in the gearbox at a predetermined rate. The metering jet provides flow of the lubrication fluid onto the bearing even when the supply line no longer provides pressurized lubrication fluid to the reserve housing.

SUMMARY OF THE INVENTION

In one embodiment, the present invention includes a system for system for preventing or reducing water penetration of a gearbox, the system including a fan or impeller coupled to the gearbox; and a hub coupled to the fan and shaped to provide a labyrinth seal that prevents or reduces water penetration into the gearbox. In one aspect, the gearbox is connected to an engine in a car, truck, locomotive, aircraft, or rotorcraft. In another aspect, the gearbox is a main rotor gearbox, an intermediate gearbox, or a tail rotor gearbox of a rotorcraft. In another aspect, the system further includes one or more cooling fins, wherein the one or more cooling fins are metal, composite, ceramic, polymer, or combinations thereof. In another aspect, the gearbox is a pressurized gearbox or a non-pressurized gearbox. In another aspect, the gearbox is a pressurized gearbox using a pressurized lubricant. In another aspect, the pressurized lubricant is a petroleum lubricant, a mineral oil, a plant oil, a synthetic lubricant, a high temperature lubricant, or combinations thereof. In another aspect, the gearbox further includes at least one of: a filter, a pump, a bearing, or one or more valves for the pressurized lubricant. In another aspect, the system further includes an active cooling system for the pressurized lubricant. In another aspect, the gearbox is at least partially lubricated by the pressurized lubricant.

In another embodiment, the present invention includes a system for preventing or reducing water penetration of a gearbox of an aircraft, the system including a gearbox; and a fan assembly including a fan and a hub, the fan assembly positioned proximate to the gearbox, wherein the hub is coupled to the fan and creates a labyrinth seal that prevents or reduces water penetration into the gearbox. In one aspect, the gearbox is connected to an engine in a car, truck, locomotive, aircraft, or rotorcraft. In another aspect, the gearbox is a main rotor gearbox, an intermediate gearbox, or a tail rotor gearbox of a rotorcraft. In another aspect, the system further includes one or more cooling fins, wherein the one or more cooling fins are metal, composite, ceramic, polymer, or combinations thereof. In another aspect, a length and a width of each the one or more cooling fins are modified to optimize an amount of heat convected by the cooling fins. In another aspect, the gearbox is a pressurized gearbox using a pressurized lubricant. In another aspect, the pressurized lubricant is a petroleum lubricant, a mineral oil, a plant oil, a synthetic lubricant, a high temperature lubricant, or combinations thereof. In another aspect, the gearbox further includes at least one of: a filter, a pump, a bearing, or one or more valves for the pressurized lubricant. In another aspect, the system further includes an active cooling system for the lubricant.

In another embodiment, the present invention includes a method preventing or reducing water penetration of a gearbox, the method including disposing a fan assembly including a fan and a hub positioned proximate to the gearbox, wherein the hub creates a labyrinthine path that prevents or reduces water penetration into the gearbox.

In another embodiment, the present invention includes a kit for preventing or reducing water penetration of a gearbox, the kit including a fan assembly including a fan and a hub positioned proximate to the gearbox, wherein the hub creates a labyrinthine path that prevents or reduces water penetration into the gearbox; and instructions for placing the fan assembly proximate to the gearbox to prevent or reduce water penetration of the gearbox.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This invention is generally in the field of drive systems, and relates specifically to pressurized and non-pressurized gearboxes that are cooled through convection to the surrounding environment. Specifically, this invention relates to a labyrinth seal on an existing fan used on many gearboxes, including but not limited to pressurized gearboxes and non-pressurized gearboxes such as splash-lubricated gearboxes. The invention addresses a common failure point gearboxes.

Figure 1:
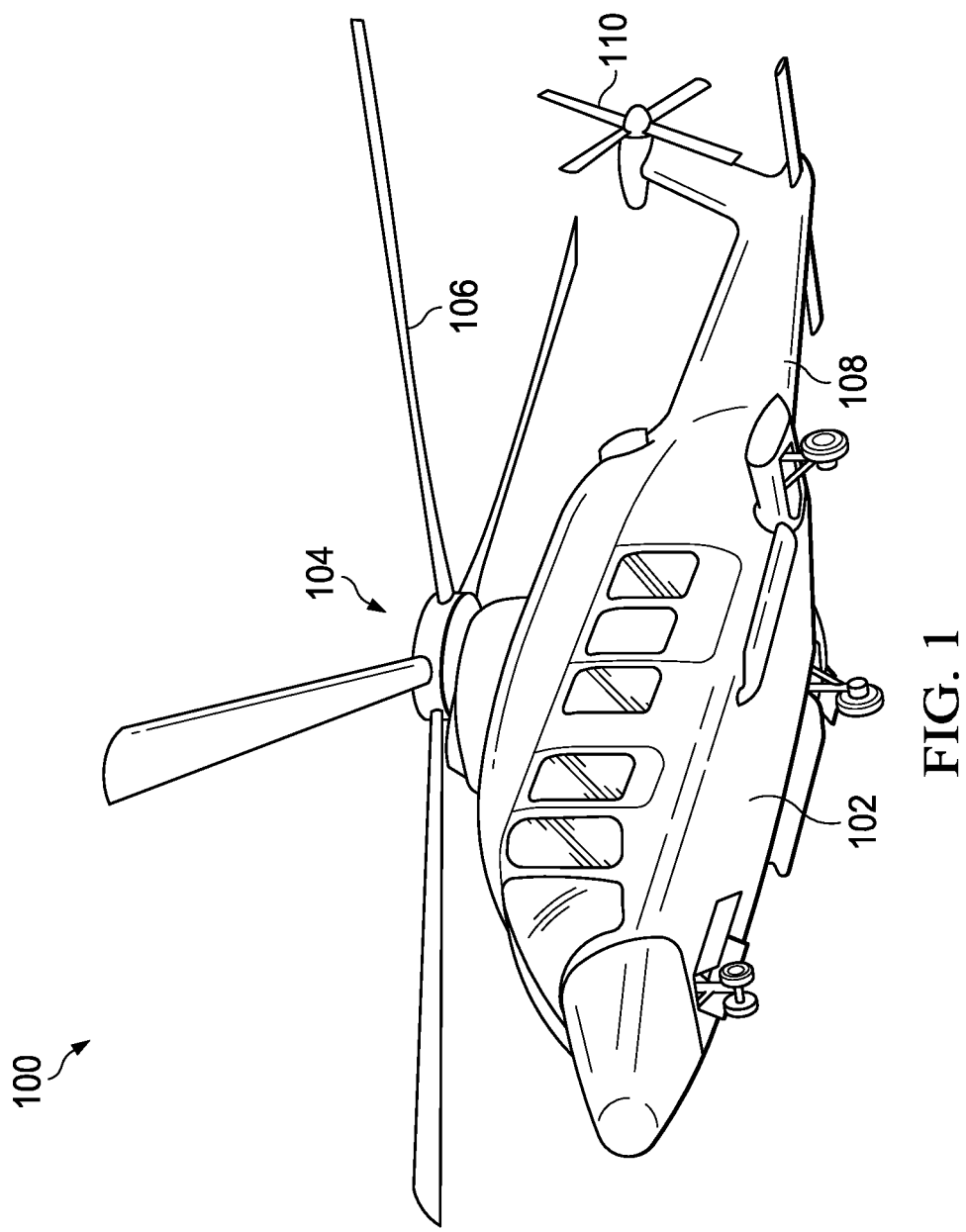
FIG. 1 shows a side view of a helicopter according to a preferred embodiment of the present application.

FIG. 1 shows an aircraft 100 in accordance with a preferred embodiment of the present application. In the exemplary embodiment, aircraft 100 is a helicopter having a fuselage 102 and a rotor system 104 carried thereon. A plurality of rotor blades 106 is operably associated with a rotor system 104 for creating flight. A tail boom 108 is depicted that further includes tail rotor 110.

Figure 2:
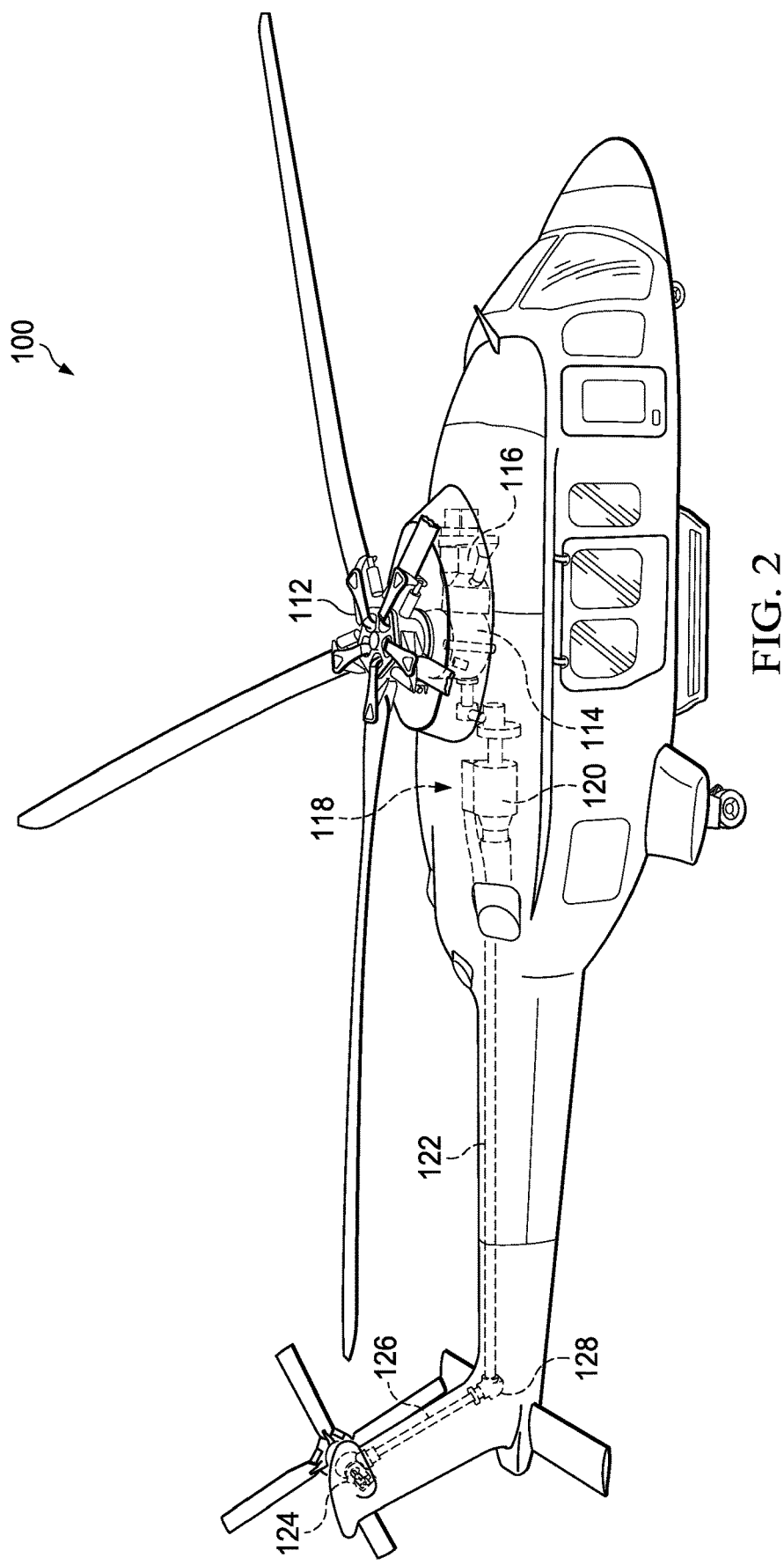
FIG. 2 shows a partial cross-section, perspective view of helicopter aircraft according to an alternative embodiment of the present application.

For example, FIG. 2 shows a partial cross-section isometric view of helicopter 100 that includes additional detail of the present invention. Helicopter 100 further includes a rotor mast 112, which is connected to the main transmission 114. The main transmission 114 is connected to one or more accessory gear boxes 116. The main transmission is connected to an engine 120, which is in an engine compartment 118. A tail rotor drive shaft 122 transmits mechanical rotation to the intermediate gear box 128, which is connected to the tail rotor gear box 124 via tail rotor drive shaft 126.

Figure 3:
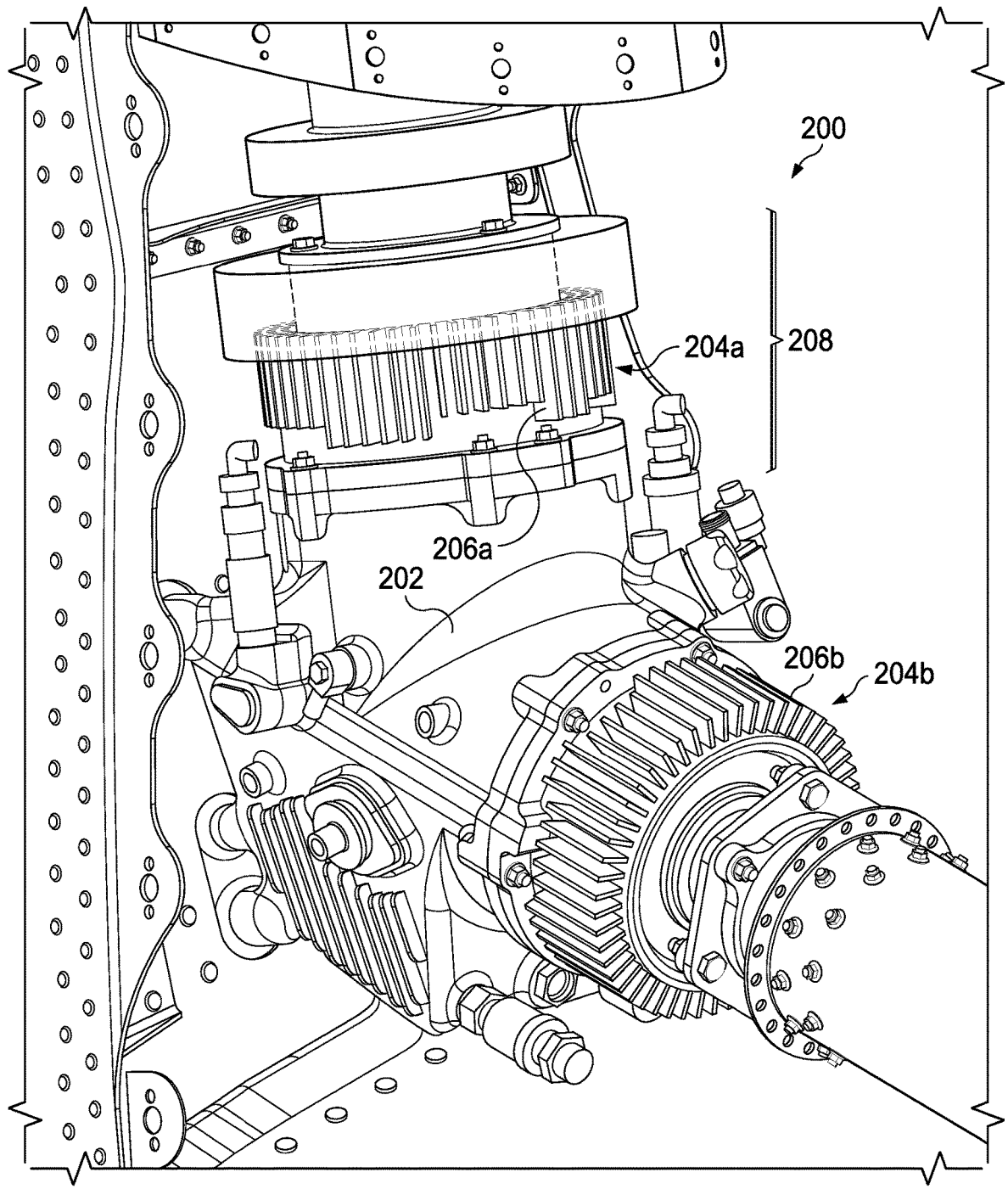
FIG. 3 is an isometric view of one exemplary and non-limiting example of a gearbox for a tail rotor of a rotorcraft that includes the present invention.

FIG. 3 is an isometric view of one exemplary and non-limiting example of a gearbox 200 for a tail rotor of a rotorcraft that shows the fan and hub of the present invention. In this figure, a pressurized intermediate gearbox is depicted, however, the present invention can be used with a variety of other types of gearboxes, and to provide both cooling and a prevention or reduction of water penetration into the gearbox. While a pressurized gearbox 200 is depicted, the present invention can be used with any pressurized or non-pressurized gearbox.

gearbox 200 as illustrated here includes pressurized gear mechanism 202, in this case is shown with a first and a second pressurized annuli 204a, 204b, shown with cooling fins 206a, 206b, respectively. The first and a second pressurized annuli 204a, 204b, radiate heat from a pressurized lubricating fluid or oil within the first and second pressurized annuli 204a, 204b via cooling fins 206a, 206b, to actively reduce the temperature of the pressurized lubricating fluid or oil in contact with the gearbox housing. A fan or impeller 208 is depicted that is above the pressurized gearbox 200 and that provides forced air cooling to the pressurized gearbox 200, which increases the cooling of the pressurized gearbox 200 and/or lubricating fluid within the same via cooling fins 206a, 206b. The fan or impeller 208 also includes a hub 210 (see FIG. 4) that is shaped to be a labyrinth seal to prevent or reduce water intrusion of the pressurized gearbox 200. The present invention can be used with any gearbox that may be subject to water penetration. Non-limiting examples of where a pressurized gearbox 200 can be used includes the main engine to transmission gearbox, any gears used as couplers, the main rotor gearbox, the intermediate gearbox, or the tail rotor gearbox.

Figure 4:
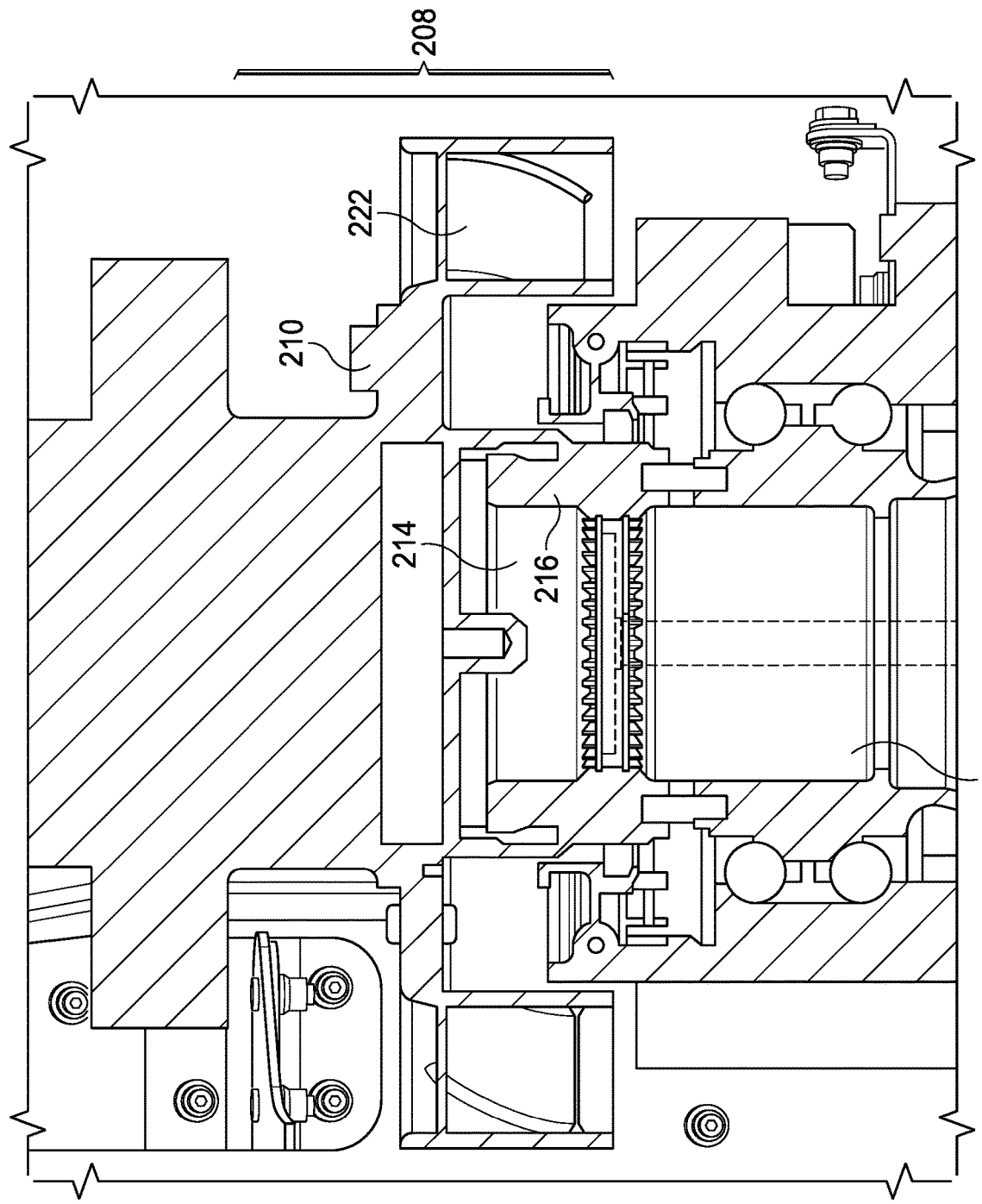
FIG. 4 shows a cross-sectional view of the fan in relation to the top of the gearbox.

FIG. 4 shows a cross-sectional view of the fan or impeller 208 and hub 210 in relation to the top of the gearbox. The shaft 212 from the gearbox connects to the shaft 214 that transfers rotational power from the gearbox to another component of the aircraft, such as a tail rotor, main rotor or another transmission. The fan or impeller 208 is depicted with fan blades 222 in relation to the hub 210. Oil seal 216 is positioned against the outside of shaft 214 to keep lubricant in gearbox 200 and to prevent contaminants from entering gearbox 200, but oil seal 216 is generally not sufficient by itself to prevent water intrusion.

While described in the form of a fan or impeller 208, the present invention can use any type of mechanical, electrical, electro-mechanical, pneumatic, hydraulic or other type of power to drive a fan or impeller having any shape to aid in cooling the gearbox and preventing water penetration. Non-limiting types of fans or impellers includes, e.g., axial, centrifugal, cross-flow, bellows, coanda effect, convective or electrostatic. In certain embodiments, the fan or impeller 208 is driven by gearbox 200, but in other embodiments, fan or impeller 208 may be driven by electric fans that are powered by shaded pole AC motors, or brushed or brushless DC motors.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process step(s), or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial," or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A system for preventing or reducing water penetration of a tail rotor gearbox, the system comprising:
   a fan or impeller coupled to, and above, the tail rotor gearbox; and
   a hub coupled to the fan and shaped to provide a labyrinth seal that prevents or reduces water penetration into the tail rotor gearbox, wherein the hub extends to a position below a top of an oil seal and the hub prevents water penetration of the tail rotor gearbox.

2. The system of claim 1, further comprising one or more cooling fins, wherein the one or more cooling fins are metal, composite, ceramic, polymer, or combinations thereof.

3. The system of claim 1, wherein the tail rotor gearbox is a pressurized tail rotor gearbox or a non-pressurized tail rotor gearbox.

4. The system of claim 3, wherein the tail rotor gearbox is a pressurized tail rotor gearbox using a pressurized lubricant.

5. The system of claim 4, wherein the pressurized lubricant is a petroleum lubricant, a mineral oil, a plant oil, a synthetic lubricant, a high temperature lubricant, or combinations thereof.

6. The system of claim 4, wherein the tail rotor gearbox further comprises at least one of: a filter, a pump, a bearing, or one or more valves for the pressurized lubricant.

7. The system of claim 4, further comprising an active cooling system for the pressurized lubricant.

8. The system of claim 4, wherein the tail rotor gearbox is at least partially lubricated by the pressurized lubricant.

9. A system for preventing or reducing water penetration of a tail rotor gearbox of an aircraft, the system comprising:
   a tail rotor gearbox; and
   a fan assembly comprising a fan and a hub, the fan assembly positioned above the tail rotor gearbox, wherein the hub is coupled to the fan and creates a labyrinth seal that prevents or reduces water penetration into the tail rotor gearbox, wherein the hub extends to a position below a top of an oil seal and prevents water penetration of the tail rotor gearbox.

10. The system of claim 9, further comprising one or more cooling fins, wherein the one or more cooling fins are metal, composite, ceramic, polymer, or combinations thereof.

11. The system of claim 10, wherein a length and a width of each the one or more cooling fins are modified to optimize an amount of heat convected by the cooling fins.

12. The system of claim 9, wherein the tail rotor gearbox is a pressurized tail rotor gearbox using a pressurized lubricant.

13. The system of claim 12, wherein the pressurized lubricant is a petroleum lubricant, a mineral oil, a plant oil, a synthetic lubricant, a high temperature lubricant, or combinations thereof.

14. The system of claim 12, wherein the tail rotor gearbox further comprises at least one of: a filter, a pump, a bearing, or one or more valves for the pressurized lubricant.

15. The system of claim 12, further comprising an active cooling system for the lubricant.

16. A method for preventing or reducing water penetration of a tail rotor gearbox, the method comprising:
disposing a fan assembly comprising a fan and a hub positioned above the tail rotor gearbox, wherein the hub creates a labyrinthine path that prevents or reduces water penetration into the tail rotor gearbox, wherein the hub extends to a position below a top of an oil seal to prevent water penetration of the tail rotor gearbox.

17. A kit for preventing or reducing water penetration of a tail rotor gearbox, the kit comprising:
a fan assembly comprising a fan and a hub positioned above the tail rotor gearbox, wherein the hub creates a labyrinthine path that prevents or reduces water penetration into the tail rotor gearbox; and
instructions for placing the fan assembly proximate to the tail rotor gearbox to prevent or reduce water penetration of the tail rotor gearbox, wherein the hub extends to a position below a top of an oil seal and prevents water penetration of the tail rotor gearbox.

18. The kit of claim 17, further comprising one or more cooling fins, wherein the one or more cooling fins are metal, composite, ceramic, polymer, or combinations thereof.

19. The kit of claim 18, wherein a length and a width of each the one or more cooling fins are modified to optimize an amount of heat convected by the cooling fins.

20. The kit of claim 17, wherein the tail rotor gearbox is a pressurized tail rotor gearbox or a non-pressurized tail rotor gearbox.

21. The kit of claim 20, wherein the tail rotor gearbox is a pressurized tail rotor gearbox using a pressurized lubricant.

22. The kit of claim 21, wherein the pressurized lubricant is a petroleum lubricant, a mineral oil, a plant oil, a synthetic lubricant, a high temperature lubricant, or combinations thereof.

23. The kit of claim 21, wherein the tail rotor gearbox further comprises at least one of: a filter, a pump, a bearing, or one or more valves for the pressurized lubricant.

24. The kit of claim 21, further comprising an active cooling system for the pressurized lubricant.

25. The kit of claim 21, wherein the tail rotor gearbox is at least partially lubricated by the pressurized lubricant.

26. The method of claim 16, further comprising one or more cooling fins, wherein the one or more cooling fins are metal, composite, ceramic, polymer, or combinations thereof.

27. The method of claim 26, wherein a length and a width of each the one or more cooling fins are modified to optimize an amount of heat convected by the cooling fins.

28. The method of claim 16, wherein the tail rotor gearbox is a pressurized tail rotor gearbox or a non-pressurized tail rotor gearbox.

29. The method of claim 28, wherein the tail rotor gearbox is a pressurized tail rotor gearbox using a pressurized lubricant.

30. The method of claim 29, wherein the pressurized lubricant is a petroleum lubricant, a mineral oil, a plant oil, a synthetic lubricant, a high temperature lubricant, or combinations thereof.

31. The method of claim 29, wherein the tail rotor gearbox further comprises at least one of: a filter, a pump, a bearing, or one or more valves for the pressurized lubricant.

32. The method of claim 29, further comprising an active cooling system for the pressurized lubricant.

33. The method of claim 29, wherein the tail rotor gearbox is at least partially lubricated by the pressurized lubricant.

34. The system of claim 2, wherein a length and a width of each the one or more cooling fins are modified to optimize an amount of heat convected by the cooling fins.

35. The system of claim 9, wherein the tail rotor gearbox is a pressurized tail rotor gearbox or a non-pressurized tail rotor gearbox.

36. The system of claim 12, wherein the tail rotor gearbox is at least partially lubricated by the pressurized lubricant.

* * * * *